United States Patent
Rehg et al.

(10) Patent No.: US 6,240,198 B1
(45) Date of Patent: *May 29, 2001

(54) METHOD FOR FIGURE TRACKING USING 2-D REGISTRATION

(75) Inventors: James Matthew Rehg, Arlington, MA (US); Daniel D. Morris, Pittsburgh, PA (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,478

(22) Filed: Apr. 13, 1998

(51) Int. Cl.$^7$ .................................................. G06K 9/00
(52) U.S. Cl. ................................... 382/103; 382/107
(58) Field of Search .................... 345/473, 474; 382/103, 107; 395/152; 703/6

(56) References Cited

U.S. PATENT DOCUMENTS

| | | | | |
|---|---|---|---|---|
| 5,012,522 | * | 4/1991 | Lambert | 382/2 |
| 5,177,794 | * | 1/1993 | Kawasaki et al. | 382/48 |
| 5,227,985 | | 7/1993 | DeMenthon | 364/559 |
| 5,280,530 | | 1/1994 | Trew et al. | 382/1 |
| 5,485,533 | | 1/1996 | Hatano et al. | 382/236 |
| 5,623,428 | * | 4/1997 | Kunii et al. | 364/578 |
| 5,692,117 | * | 11/1997 | Berend et al. | 395/152 |
| 5,710,875 | | 1/1998 | Harashima et al. | 345/419 |
| 5,714,997 | | 2/1998 | Anderson | 348/39 |
| 5,748,199 | | 5/1998 | Palm | 345/473 |
| 5,778,098 | | 7/1998 | Lee et al. | 382/236 |
| 5,825,368 | | 10/1998 | Wilks | 345/440 |
| 5,847,716 | * | 12/1998 | Hashimoto | 345/473 |
| 5,930,379 | * | 7/1999 | Regh et al. | 382/107 |
| 5,990,908 | * | 11/1999 | Thingvold | 345/474 |

OTHER PUBLICATIONS

Tian et al., "A General Approach for Determining 3D Motion and Structure of Multiple Objects from Image Trajectories", IEEE, pp 110–115 (1994).

(List continued on next page.)

*Primary Examiner*—Matthew C. Bella
*Assistant Examiner*—M B Choobin
(74) *Attorney, Agent, or Firm*—Hamilton, Brook, Smith & Reynolds, P.C.

(57) ABSTRACT

In a computerized method, a moving articulated figure is tracked in a sequence of 2-D images measured by a monocular camera. The images are individually registered with each other using a 2-D scaled prismatic model of the figure. The 2-D model includes a plurality of links connected by revolute joints to form is a branched, linear-chain of connected links. The registering produces a state trajectory for the figure in the sequence of images. During a reconstructing step, a 3-D model is fitted to the state trajectory to estimate kinematic parameters, and the estimated kinematic parameters are refined using an expectation maximization technique.

12 Claims, 8 Drawing Sheets

OTHER PUBLICATIONS

M. Yamamoto and K. Koshikawa. Human motion analysis based on a robot arm model. In Computer Vision and Pattern Recognition, pp. 664–665, 1991. Also see Electrotechnical Laboratory Report 90–46.

J. M. Rehg and T. Kanade. Visual tracking of high dof articulated structures: an application to human hand tracking. In Jan–Olof Eklundh, editor, Proceedings of European Conference on Computer Vision, vol. 2, pp. 35–46, Stockholm, Sweden, 1994. Springer–Verlag.

A. Pentland and B. Horowitz. Recovery of nonrigid motion and structure. IEEE Transactions on Pattern Analysis and Machine Intelligence, 13(7):730–742, 1991.

Nobutaka Shimada, Yoshiaki Shirai, and Yoshinori Kuno. Hand gesture recognition using computer vision based on model–matching method. In Sixth Intl. Conf. On Human–Computer Interaction, Yokohama, Japan, Jul. 9–14, 1995.

D. Hogg. Model–based vision: a program to see a walking person. Image and Vision Computing, 1(1):5–20, 1983.

D. M. Gavrila and L. S. Davis. 3–D model–based tracking of humans in action: A multi–view approach. In Computer Vision and Pattern Recognition, pp. 73–80, San Francisco, CA, 1996.

I. Kakadiaris and D. Metaxas. Model–based estimation of 3D human motion with occlusion based on active multi–viewpoint selection. In Computer Vision and Pattern Recognition, pp. 81–87, San Francisco, CA, Jun. 18–20 1996.

Bregler, et al.; Video Motion Capture UCB//CSD–97–973, Submitted to SIGGAPH 1998, http://www.cs.berkeley.edu/~bregler/digmuy.html.

* cited by examiner

METHOD FOR FIGURE TRACKING USING 2-D REGISTRATION

FIELD OF THE INVENTION

This invention relates generally to vision systems, and more particularly to tracking three-dimensional figures in a sequence of two-dimensional images.

BACKGROUND OF THE INVENTION

The problem of video-based figure tracking has received a great deal of recent attention, and is the subject of a growing commercial interest. The essential idea is to employ a kinematic model of a figure to estimate its motion from a sequence of video images, given a known starting pose of the figure. The result is a 3-D description of figure motion which can be employed in a number of advanced video and multi-media applications. These applications include video editing, motion capture for computer graphics animation, content-based video retrieval, athletic performance analysis, surveillance, and advanced user-interfaces. In the most interesting applications, the figures are people.

One way to track the moving body of a human figures, i.e., the head, torso, and limbs, is to model the body as an articulated object composed of rigid parts, called links, that are connected by movable joints. The kinematics of an articulated object provide the most fundamental constraint on its motion. There has been a significant amount of research in the use of 3-D kinematic models for the visual tracking of people.

Kinematic models describe the possible motions, or degrees of freedom (DOF) of the articulated object. In the case of the human figure, kinematic models capture basic skeletal constraints, such as the fact that the knee acts as a hinge allowing only one degree of rotational freedom between the lower and upper leg.

The goal of figure tracking is to the estimate the 3-D motion of the figure using one or more sequences of video images. Typically, motion is represented as a trajectory of the figure in a state space. The trajectory is described by kinematic parameters, such as joint angles and link lengths. In applications where it is possible to use multiple video cameras to image a moving figure from a wide variety of viewpoints, good results for 3-D tracking can be obtained. In fact, this approach, in combination with the use of retro-reflective targets placed on the figure, is the basis for the optical motion capture industry.

However, there are many interesting applications in video editing and retrieval where only a single camera view of a moving figure is available, for example movies and television broadcasts. When traditional 3-D kinematic model-based tracking techniques are applied in these situations, the performance of the tracker will often be poor. This is due to the presence of kinematic singularities. Singularities arise when instantaneous changes in the state space of the figure produce no appreciable trajectory change in the image measurements of the kinematic parameters. For example, when the arm is rotated towards the camera, it may not appear to be moving very much. This situation causes standard gradient-based estimation schemes to fail.

Furthermore, in many video processing applications, there may not be a great deal of prior information available about the moving figures. In particular, dimensions such as the lengths of the arms and legs may not be known. Thus, it would be desirable to infer as much as possible about the 3-D kinematics from the video imagery itself.

The prior art can be divided into 2-D and 3-D methods. In 2-D tracking methods, the figure is represented as a collection of templates, or pixel regions, that follow a simple 2-D motion model, such as affine image flow. These methods suffer from two problems that make them unsuitable for many applications. First, there is no obvious method for extracting 3-D information from the output of these methods, as they have no straightforward connection to the 3-D kinematics of the object. As a result, it is not possible, for example, to synthesize the tracked motion as it would be imaged from a novel camera viewpoint, or to use motion of the templates to animate a different shaped object in 3-D. Second, these methods typically represent the image motion with more parameters than a kinematically-motivated model would require, making them more susceptible to noise problems.

There has been a great deal of work on 3-D human body tracking using 3-D kinematic models. Most of these 3-D models employ gradient-based estimation schemes, and, therefore, are vulnerable to the effects of kinematic singularities. Methods that do not use gradient techniques usually employ an ad-hoc generate-and-test strategy to search through state space. The high dimensionality of the state space for an articulated figure makes these methods dramatically slower than gradient-based techniques that use the local error surface gradient to quickly identify good search directions. As a result, generate-and-test strategies are not a compelling option for practical applications, for example, applications that demand results in real time.

Gradient-based 3-D tracking methods exhibit poor performance in the vicinity of kinematic singularities. This effect can be illustrated using a simple one link object 100 depicted in FIG. 1a. There, the link 100 has one DOF due to joint 101 movably fixed to some arbitrary base. The joint 101 has an axis of rotation perpendicular to the plane of FIG. 1a. The joint 101 allows the object 100 to rotate by the angle 74 in the plane of the Figure.

Consider a point feature 102 at the distal end of the link 100. As the angle θ varies, the feature 102 will trace out a circle in the image plane, and any instantaneous changes in state will produce an immediate change in the position of the feature 102. Another way to state this is that the velocity vector for the feature 102, $V_\theta$, is never parallel to the viewing direction, which in this case is perpendicular to the page.

In FIG. 1b, the object 100 has an additional DOF. The extra DOF is provided by a mechanism that allows the plane in which the point feature 102 travels to "tilt" relative to the plane of the page. The Cartesian position (x, y) of the point feature 102 is a function of the two state variables θ and φ given by:

$$x=\cos(\phi)\sin(\theta), y=\cos(\theta).$$

This is simply a spherical coordinate system of unit radius with the camera viewpoint along the z axis.

The partial derivative (velocity) of any point feature position with respect to the state, also called the "Jacobian," can be expressed as:

$$\begin{bmatrix} dx \\ dy \end{bmatrix} = Jdq = \begin{bmatrix} -\sin(\theta)\sin(\phi) & \cos(\theta)\cos(\phi) \\ 0 & -\sin(\theta) \end{bmatrix} \begin{bmatrix} d\phi \\ d\theta \end{bmatrix}$$

Singularities arise when the Jacobian matrix J loses rank. In this case, rank is lost when either sin(φ) or sin(θ) is equal to zero. In both cases, $J_{singq}dq=0$ for state changes $dq=[1 0]^T$, implying that changes in φ cannot be recovered from point feature measurements in this configurations.

Singularities impact visual tracking by their effect on state estimation using error minimization. Consider tracking the object 100 of FIG. 1*b* using the well known Levenberg-Marquardt update step:

$$q_k = q_{k-1} + dq_k = q_{k-1} - (J^T J + \Lambda)^- J^T R,$$

where Λ is a stabilizing matrix with diagonal entries. See Dennis et al., "Numerical Methods for Unconstrained Optimization and Nonlinear Equations," Prentice-Hall, Englewood Cliffs, N.J., 1983 for details.

At the singularity sin(φ)=0, the update step for all trajectories has the form dq =[0 C], implying that no updates to φ will occur regardless of the measured motion of the point feature 102. This singularity occurs, for example, when the link rotates through a plane parallel to the image plane, resulting in a point velocity $V_\phi$ which is parallel to the camera or viewing axis.

FIG. 2 graphically illustrates the practical implications of singularities on tracker performance. In FIG. 2, the x-axis plots iterations, and the y-axis plots the angle φ in terms of radians. The stair-stepped solid line 201 corresponds to discrete steps in φ of a simulation of the two DOF object 100 of FIG. 1*b*. The solid line 201 shows the state estimates produced by the update equation as a function of the number of iterations of the solver.

The increased "damping" in the estimator, shown by the dotted line 202, as the trajectory approaches the point when φ=0 is symptomatic of tracking near singularities. In this example, the singular state was never reached. In fact, at point 204, the tracker makes a serious error and continues in a downward direction opposite the true motion as a consequence of the usual reflective ambiguity under orthographic projection. This is shown by the dashed line 203. A correct tracker would follow the upward portion of the solid line 201.

In addition to singularity problems, tracking with 3-D kinematic models also requires the 3-D geometry of the object to be known in advance, particularly the lengths of the links. In order to track a particular person, the figure model must first be tuned so that the arms, legs, and torso have the correct dimensions. This can be non-trivial in practice, due to the difficulty of measuring the exact locations of the joint centers in the images.

In one prior method, a two stage tracking technique is used to track hand gestures. See Shimada et al. in "3-D Hand Pose Estimation and Shape Model Refinement from a Monocular Image Sequence," Intl. Conf. on Virtual Systems and Multimedia, pp. 423–428, Gifu, Japan, Sep. 18, 1996, and Shimada et al. in "Hand Gesture Recognition Using Computer Vision Based on Model-Matching Method," Sixth Intl. Conf. on Human-Computer Interaction, Yokohama, Japan, Jul. 9, 1995.

In their first stage, hands are tracked using a crude 3-D estimate of hand motion that is obtained by matching to extracted silhouettes. In their second stage, model parameters are adapted using an Extended Kalman Filter (EKF).

The first stage of their sampling is based on adaptive sampling of the state space, and requires a full 3-D model. This limits the method to situations where complete 3-D kinematic models are available. Furthermore, the adaptive sampling is dependent on the dimensions of the links, and requires separate models for hands of varying sizes.

The second stage adapts a previously specified 3-D kinematic model to a particular individual. This requires fairly close agreement between the original model and the subject, or else the EKF may fail to converge.

Another method is described by Ju et al. in "Cardboard people: A Parameterized Model of Articulated Image Motion," Intl. Conf. Automatic Face and Gesture Recognition, pp. 38–44, Killington, VT, 1996. There, each link is tracked with a separate template model, and adjacent templates are joined through point constraints. The method is not explicitly connected to any 3-D kinematic model, and, consequently, does not support 3-D reconstruction. In addition, the method requires a fairly large number of parameters which may degrade performance because noise is more likely to be introduced.

Therefore, there is a need for a method that can extract a 3-D kinematic model for an articulated figure from a monocular sequence of 2-D images. The 3-D model could then be used to reconstruct the figure in 3-D for any arbitrary camera or viewing angle.

SUMMARY OF THE INVENTION

The invention provides a computerized method for tracking a moving articulated figure, such as a human body, in a sequence of 2-D images measured by a single monocular camera.

The method uses a novel 2-D "scaled" prismatic model (SPM) to register or "align" the figure in each image of the sequence. The model includes a plurality of scaled prismatic links connected by revolute joints. Each link has two degrees of freedom: rotation around an axis perpendicular to the image plane at a base joint of the link, and uniform translation along a prismatic axis of the link.

Associated with each link is a template. Each template includes a plurality of pixels representing a portion of the articulated figure. The pixels of each template rotate and scale relative to two state trajectory parameters θ and d of each link. The dimensions of the template are a width w, and a height h. The template can use an intrinsic coordinate system (u, v) which is stable with respect to the coordinate system used for the model (x, y). The registering produces a state trajectory for the figure in each image of the sequence.

DETAILED DESCRIPTION OF THE PREFERRED EMBODIMENT

Described herein is a new class of "scaled" prismatic kinematic models (SPM) for 2-D tracking of articulated objects such as figures, hands, robot manipulators, animals, and humans. This new class has three advantages over models known in the prior art:

SPM do not have the debilitating singularities that conventional 3-D kinematic models used in tracking often possess;

SPM can be derived from conventional 3-D models, and it can be proven that SPM are capable of representing the image plane motion of all 3-D articulated objects with a minimum number of parameters; and the direct connection between SPM and 3-D models makes their tracked output easier to interpret. As a result, the design and application of these models are more convenient.

Figure 3:
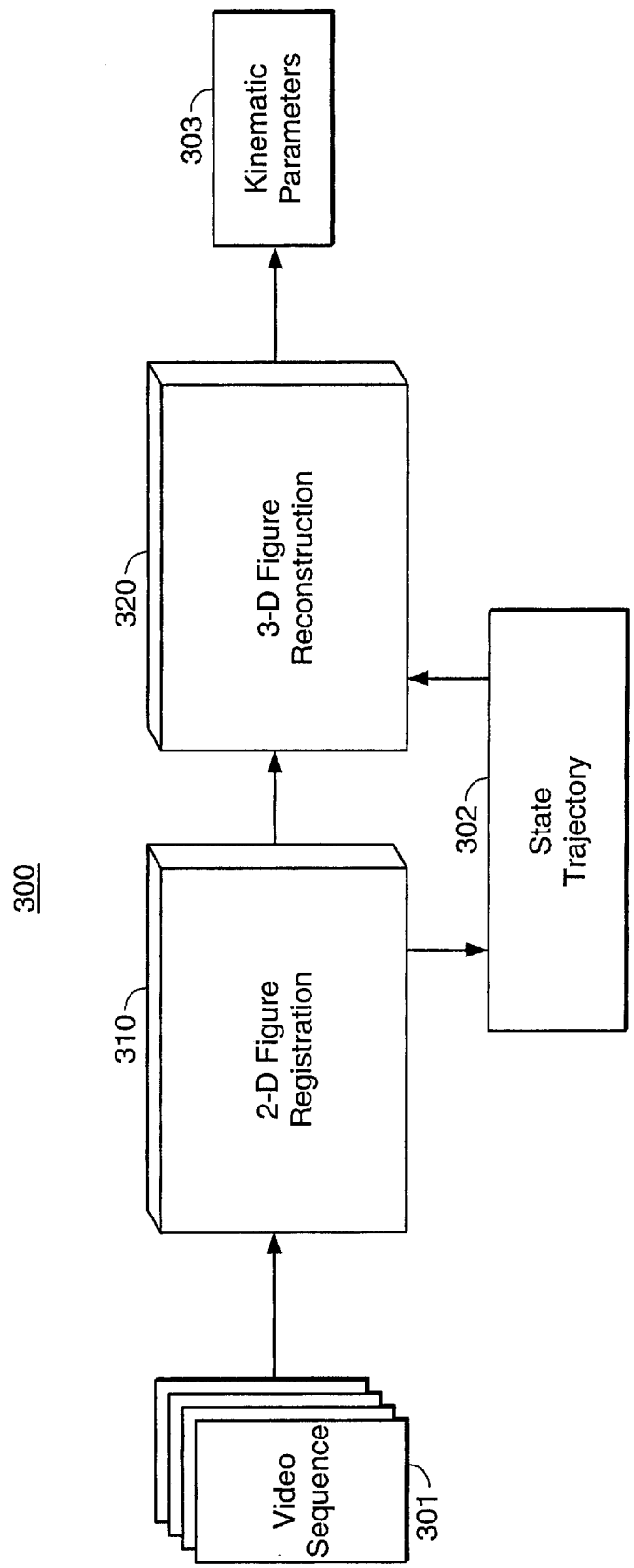
FIG. 3 is a flow diagram of two stages of a figure tracking method.

FIG. 3 shows the basic two stages of a method 300 for figure tracking using the SPM. The method includes a first "2-D figure registration" stage 310, and a second "3-D figure reconstruction" stage 320. The first stage 310 takes as input a monocular (2-D) sequence of images 301. The first stage 310 employs a 2-D kinematic model to track a figure in the images. As an advantage, the method 300 does not suffer from the singularity problems described above. In addition, the method 300 does not require, a prior, exact 3-D information about the figure, such as arm or leg lengths.

The output of the registration stage 310 is a state trajectory 302 for the figure in the image sequence 301. The state trajectory 302 registers (aligns) the 2-D model with the pose of the projected pose of the figure in each image in the sequence 301. The state trajectory 302 is provided as input to the second stage 320.

The 3-D reconstruction stage 320 globally solves the state trajectory 302 to determine kinematic parameters 303 of a 3-D kinematic model that best fit the measurements. In the reconstruction stage 320, additional information such as smoothness constraints or object dynamics can be employed to overcome the loss of measurements near singularities, e.g., knees act as hinges with a limited amount of rotation.

The separate reconstruction stage 320 makes it possible to solve for fixed kinematic parameters 303, such as link lengths, while variable parameters such as joint angles are estimated. For some applications, such as video editing or surveillance, the reconstruction, stage 320 may not even be necessary. Other applications may derive the state trajectory 302 using different methods, and only use the reconstruction stage 320. Both stages have separate and distinct advantages.

The 2-D Registration Stage

As stated above, prior art 3-D kinematic models even have difficulty tracking simple articulated objects under certain types of motion due to the presence of kinematic singularities. To overcome the singularity problem, a 2-D "scaled" prismatic model (SPM) is used to provide a complete description of the 2-D kinematic constraints of a moving articulated 3-D object.

Figure 4:
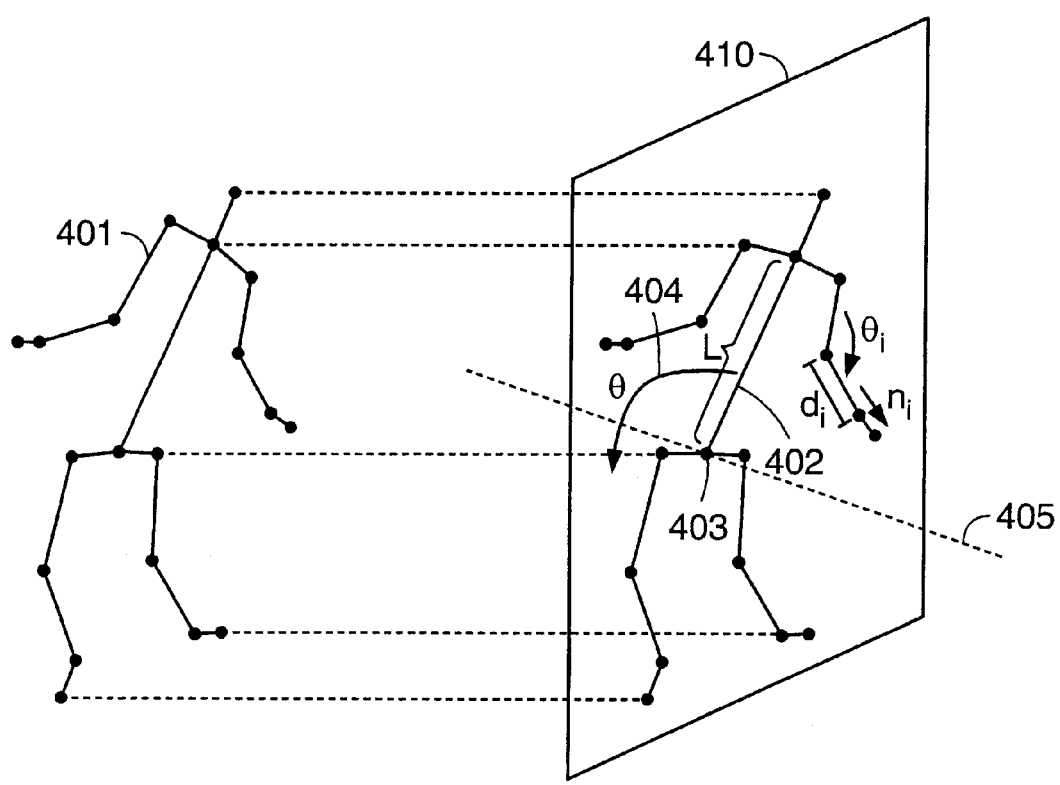
FIG. 4 is a projection of an articulated 3-D model representing a human figure onto an image plane.

As shown in FIG. 4, the SPM can be viewed as "projections" of a 3-D model 401 onto a 2-D image plane 410. The scaled prismatic model provides the strongest possible constraints that do not result in singularity problems, thereby maximizing robustness to image noise.

The scaled prismatic model acts in a plane parallel to the image plane 410 and describes all possible image projections of the equivalent 3-D model 401 under orthographic projection. Links in the SPM have the same connectivity as the 3-D figure.

Each SPM link, for example, link 402, has two degrees of freedom, rotation ($\theta$) 404 around an axis 405 perpendicular to the image plane 410 at a base joint 403, and uniform scaling along its length (L). Each link is thus described by two parameters; its angle of rotation $\theta_i$, and its scaled prismatic length $d_i$ in a direction $n_i$. A template or pixel region is "attached" to each link which rotates and scales with it. The templates can be the head, torso, and limbs of a human figure. The templates define, for example, a rectangular region of pixels.

Figure 5B:
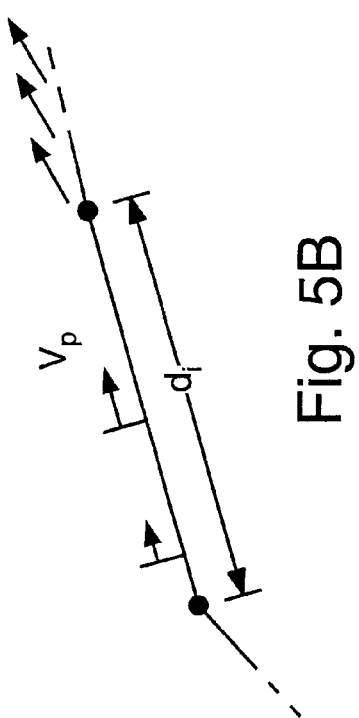
FIG. 5*b* shows the relative movement of points on the link due to scaling.
Figure 5C:
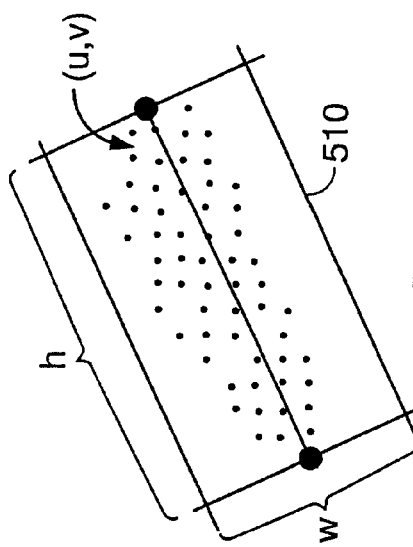
FIG. 5*c* shows a pixel template attached to the link.
Figure 5A:
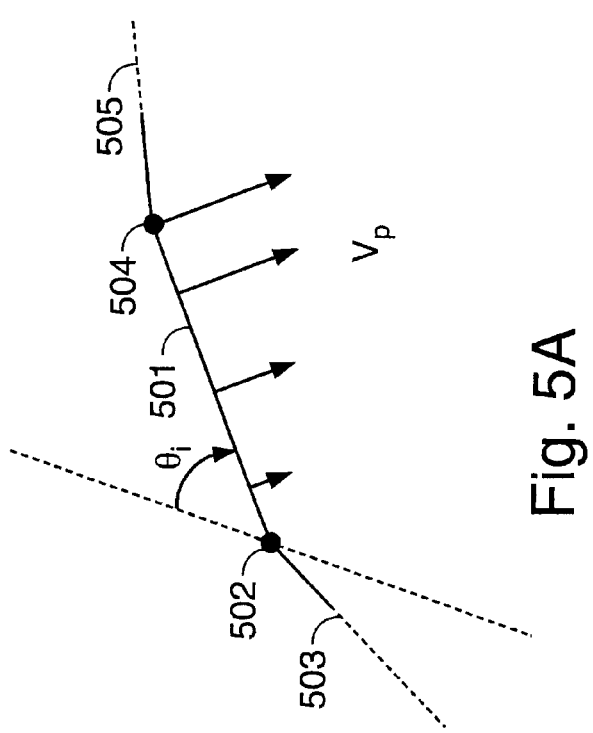
FIG. 5*a* shows the relative movement of points on a single link of the model of FIG. 4 due to rotation.

FIGS. 5a and 5b show these parameters for a single SPM link 501 with a base joint 502. The amount of link motion due to rotation is shown in FIG. 5a, and the motion due to scaling the length of the link is shown in FIG. 5b. The relative amount of motion (velocity) is shown in the Figures by the directed arrows generally labeled $V_p$. The link 501 is attached by base joint 502 to a previous link 503, and to a next link 505 by its base joint 504. The links 503, 501, and 505 can model, for example, the upper arm, lower arm, and hand. In this case, the joints 502 and 504 model the elbow and wrist.

As shown in FIG. 5c, each link is associated with a pixel template 510. The template has a width w and a height h, defining an intrinsic coordinate system (u, v). The pixels of the templates rotate and scale according to the relative motion of the links as shown in FIGS. 5a and 5b.

The basic intuition behind the scaled prismatic model is the fact that 3-D line segments project to 2-D line segments under the action of a camera model. This means that the motion of a 3-D line segment projected onto the image plane can be parameterized for a 2-D scaled link by only four numbers: image position in a plane (x and y), angle of rotation ($\theta$), and link length (d).

A kinematic chain of 3-D links connected by joints will produce a corresponding chain of 2-D line segments in the image. For a human figure, the kinematic constraints further require that the endpoint of each line segment remains attached to its neighbor, i.e, the limbs do not fly apart during figure motion. Other obvious motion constraints of the figure can also be applied.

In the general case, for any arbitrary motion, each 2-D link in the SPM or image plane model has only two degrees of freedom (DOFs), rotation in the image plane and scaling along its length. These DOFs can be represented in the SPM as one revolute and one prismatic joint per link.

The forward kinematics (state trajectory) for the SPM specify the 2-D configuration of links as a function of the degrees of freedom. Each link in the SPM has an associated link coordinate frame. The kinematics specify the parameterized transformations between these coordinate frames as a matrix:

$$T(q) = \begin{bmatrix} \cos(\theta) & -\sin(\theta) & 0 \\ \sin(\theta) & \cos(\theta) & 0 \\ 0 & 0 & 1 \end{bmatrix} \begin{bmatrix} 1 & 0 & d \\ 0 & 1 & 0 \\ 0 & 0 & 1 \end{bmatrix} = \begin{bmatrix} \cos(\theta) & -\sin(\theta) & \cos(\theta)d \\ \sin(\theta) & \cos(\theta) & \sin(\theta)d \\ 0 & 0 & 1 \end{bmatrix}$$

where $\theta$ is the angle of rotation about a revolute joint whose axis is perpendicular to the image plane and d is the translation along the prismatic joint axis x.

The kinematic transformation from frame to frame in an image sequence described by the above equation also applies to the template attached to each link. The pixels of the templates describe the overall appearance of the link as measured by a camera. The prismatic DOF for each link will scale the template at the same time that it translates the coordinate frame. Each template has an intrinsic coordinate system (u, v) with height h and width w, that is a rectangle.

The forward mapping from template coordinates (u, v) to image coordinates (x, y) is given by:

$$\begin{bmatrix} x \\ y \end{bmatrix} = \begin{bmatrix} u \\ (v/h)d \end{bmatrix} = \begin{bmatrix} u \\ bd \end{bmatrix}$$

where b=v/h gives the pixel position relative to the scaling of the link. In this model, the template is attached to an intermediate coordinate frame after the rotation but before the translation. Of course, any constant scaling and offset between the template and link coordinates can also be included through a change of variables.

Given the Jacobian (J), the SPM can be employed with any standard gradient-based tracking scheme. In an Appendix attached hereto, the Jacobian equations for the present model are derived. The derivation proves two important results:

first, any 3-D kinematic chain has a unique SPM that can exactly represent the projection of the 3-D model onto the image plane; and second, the only singularities in the SPM occur when a link$_i$'s length $d_i$ becomes zero.

The implications of these type of singularities, which are small in comparison to the prior art 3-D models, will be described below.

Figure 6:
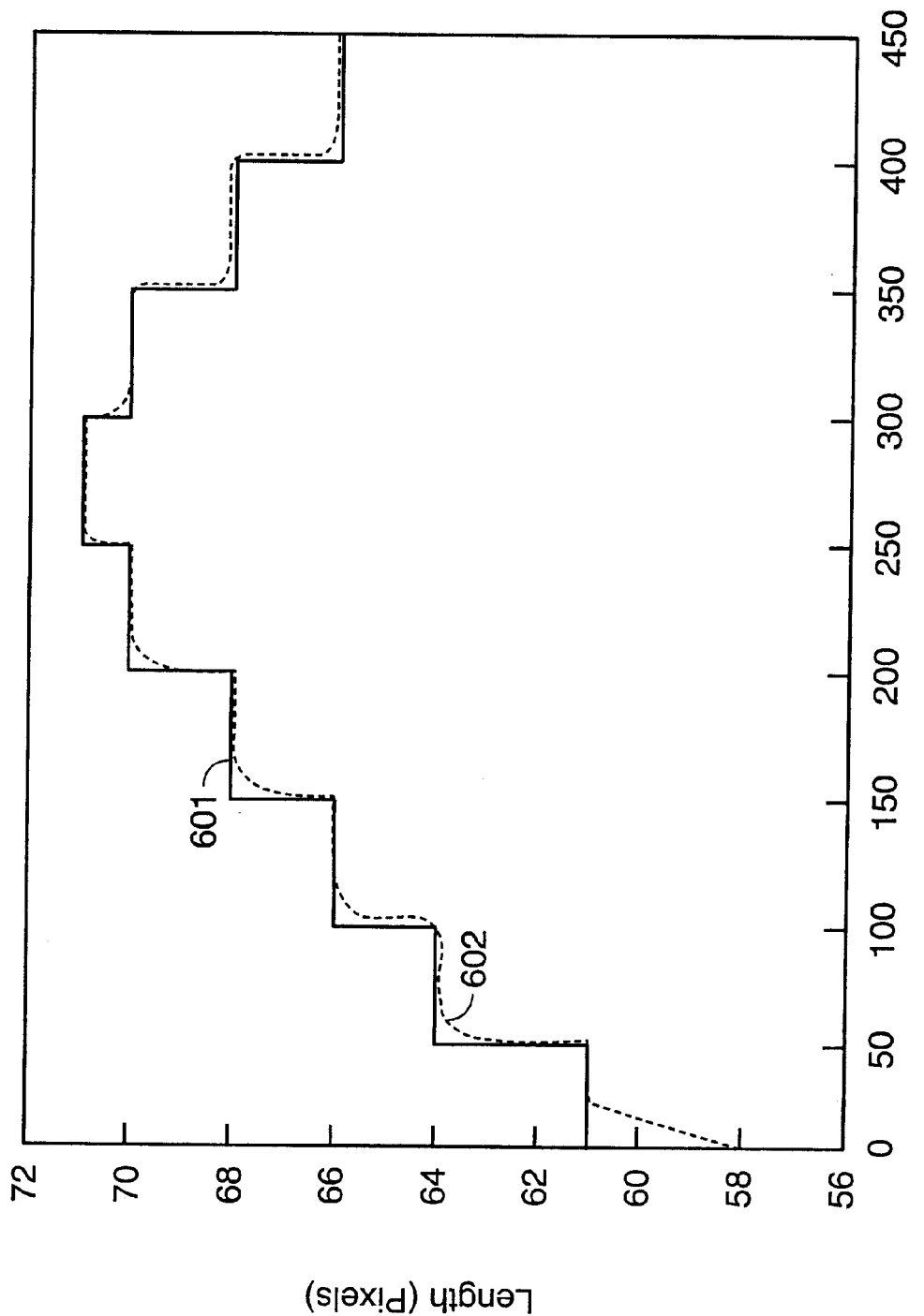
FIG. 6 is graph showing tracking through a singularity using a scaled prismatic model.

The SPM has been tested both with synthetic and real image sequences. The graph shown in FIG. 6 shows the result of applying a single link SPM to the two DOF example object of FIG. 1b. In FIG. 6, the x-axis plots iterations like FIG. 2 above, and the y-axis the scaled length of the link in terms of "unit" pixels. In other words, here the extension length rather than the angle of rotation is recovered.

Figure 1A:
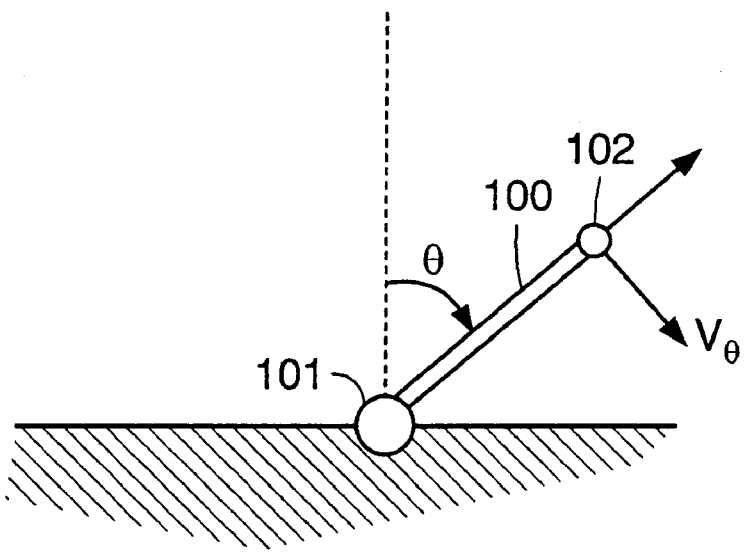
FIG. 1*a* is a planar view of an object having one degree of freedom in its movement.
Figure 1B:
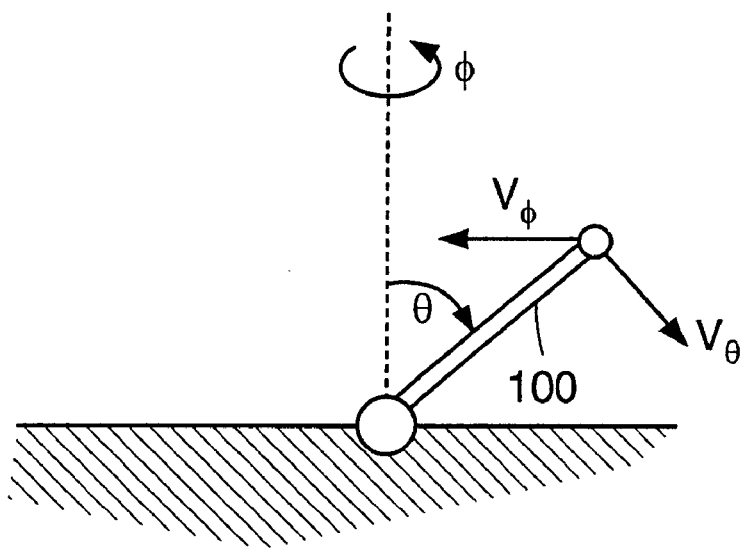
FIG. 1*b* is a planar view of the object of FIG. 1*a* with two degrees of freedom in its movement.

The stair-stepped solid line 601 corresponds to discrete steps in a simulation of the two DOF object of FIG. 1b using the SPM. The dotted line 602 shows that the SPM correctly tracks the link as its length increases and then decreases, without excessive damping.

Figure 2:
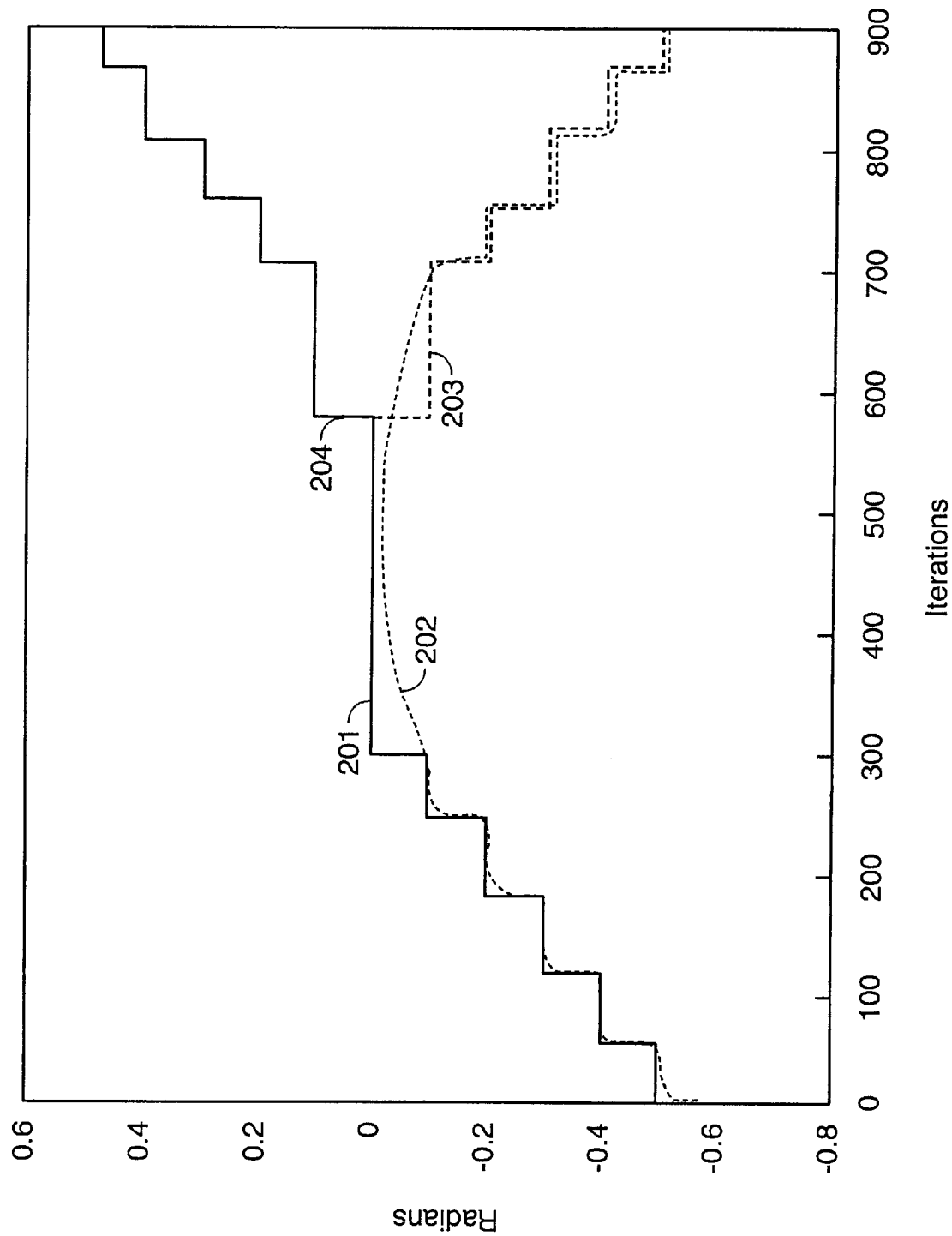
FIG. 2 is a graph showing errors due to singularities experienced by the object of FIG. 1*b* while using a prior art tracking method.

In contrast to the prior art 3-D tracking results shown in FIG. 2, the SPM correctly follows the link motion throughout the sequence. There is no appreciable change in the convergence rate around the point when φ=0, e.g., the length remains about 70 pixels, and no loss of track.

The 3-D Reconstruction Stage

Figure 7A:
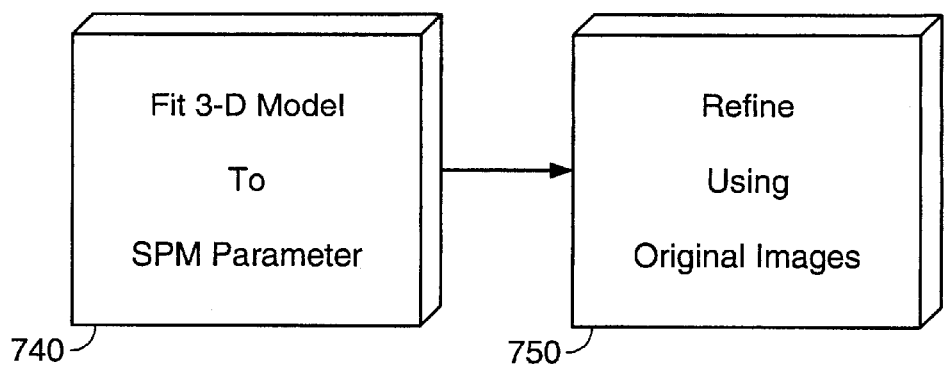
FIG. 7*a* is flow diagram of a reconstruction stage of the figure tracking method.

FIG. 7a shows the basic steps of the 3-D reconstruction stage 320. The reconstruction stage 320 has two basic steps. The first step 740 fits the 3-D model to the 2-D SPM measurements, and the second step 750 refines the estimate by returning to the original sequence of images.

Fitting 3-D Model to SPM Parameters

The first step 740 can be done using global joint optimization. Because there are no missing parameters, there will be correspondence between the measurements, i.e., the SPM states and the 3-D model parameters. The 3-D model parameters can be expressed as state (extrinsic) parameters and intrinsic parameters. The state and intrinsic parameters are estimated in a batch mode by minimizing a cost function of the form:

$$E_1(Q,I) = F_1(Q,I,M) + \Lambda S(Q),$$

where the vector Q is the concatenation of the state parameter estimates across all frames, I at this point is the constant vector of intrinsic parameters, and M is the state trajectory vector of registration data 302 obtained from the SPM state estimates in each frame during the first registration stage 310.

The vector Q will have nm elements, where n is the number of state parameters in the 3-D kinematic model and m is the number of frames in the sequence. Similarly, M will have length 2 pm where p is the number of SPM links used in the registration stage.

The function $F_1$ above determines the residual error between the image plane projection of the 3-D kinematic model in each frame of the sequence, and the corresponding measurements obtained from the SPM in the registration stage 310. This term is minimized when the 3-D model is correctly aligned (fitted) with the 2-D model across all of the frames. A representative choice would be the image plane distance between the joint centers for each link in the model.

The second term in the equation, S(Q), determines the smoothness of the state trajectory Q across the sequence of images. A representative choice would be the magnitude of the state velocity. This term can also include a dynamic model for the object and information about joint limits. The Λ term controls the amount of smoothness. This constant can be adjusted to yield the desired level of smoothness. Note that it may be necessary to adjust the relative scale of the step sizes for the intrinsic and state parameters to ensure good convergence.

The fitting step 740 requires that the intrinsic parameters (I) are known. Therefore, during the first iteration, the intrinsic parameters are initialized with a set of nominal values. If the figure is a person, then the set of nominal values can be obtained from anthropological population studies. As an advantage, the nominal values do not need to be exact for the reconstruction process to converge.

The state parameters are initialized to zero in each frame. The estimate for the state parameters should be unaffected by the choice of initial conditions, modulo the usual reflective ambiguity under orthographic projection.

The fitting step 740 can employ any batch non-linear least-squares stimation technique. A representative example is the well-known Levenberg-Marquardt update step as described above.

Refining Estimate

In the second step of reconstruction 750, the estimated state and intrinsic parameters are refined by minimizing a new cost function over the original sequence of images 301:

$$E_2(Q,I) = F_2(Q,I,V) + \Lambda S(Q)$$

where V is the video sequence 301. The function $F_2$ determines the residual error between the 2-D projections and the 3-D kinematic models in each frame of the image sequence. This term is minimized when corresponding pixels across the image sequence are as similar as possible. A representative choice for the residual at a pixel with intrinsic template coordinates (u, v) in the 3-D kinematic model is its sample variance across the sequence:

$$F_p(Q,I,V) = 1/n \, \Sigma_{i=1}^n [I(f(Q_i,I,u,v)) - I_O]^2$$

where $I_i$ denotes one of n video frames, and $I_O$ is the average image intensity:

$$I_O = 1/n \sum_{i=1}^{n} [I_i(f(Q_i,I,u,v))].$$

The function $f(Q_i, I, u, v)$ gives the image plane position u, v of each pixel in each frame in terms of the intrinsic parameters I and the state parameter in that frame, $Q_i$. The total residual $F_2$ would be obtained by summing $F_p$ over all pixels generated by the figure model.

In this example, the function $F_2$ is minimized when the pixels are registered so that the color or intensity at corresponding pixel positions varies minimally from frame to frame. One possible advantage of this residual measure, over ones used in sequential tracking, is that it does not give preferential treatment to any single video frame in the sequence.

The second step 750 of the reconstruction process can employ a novel application of the well known Expectation-Maximization (EM) algorithm as described by Redner et al. in "Mixture Densities, Maximum Likelihood, and the EM Algorithm," SIAM Review, 26:195–239, 1994. The EM algorithm simultaneously estimates two parameter sets. EM is an iterative algorithm that alternates between the two sets of parameters, estimating one set while holding the other set fixed, and vice versa. As an advantage, it is guaranteed to converge.

Figure 7B:
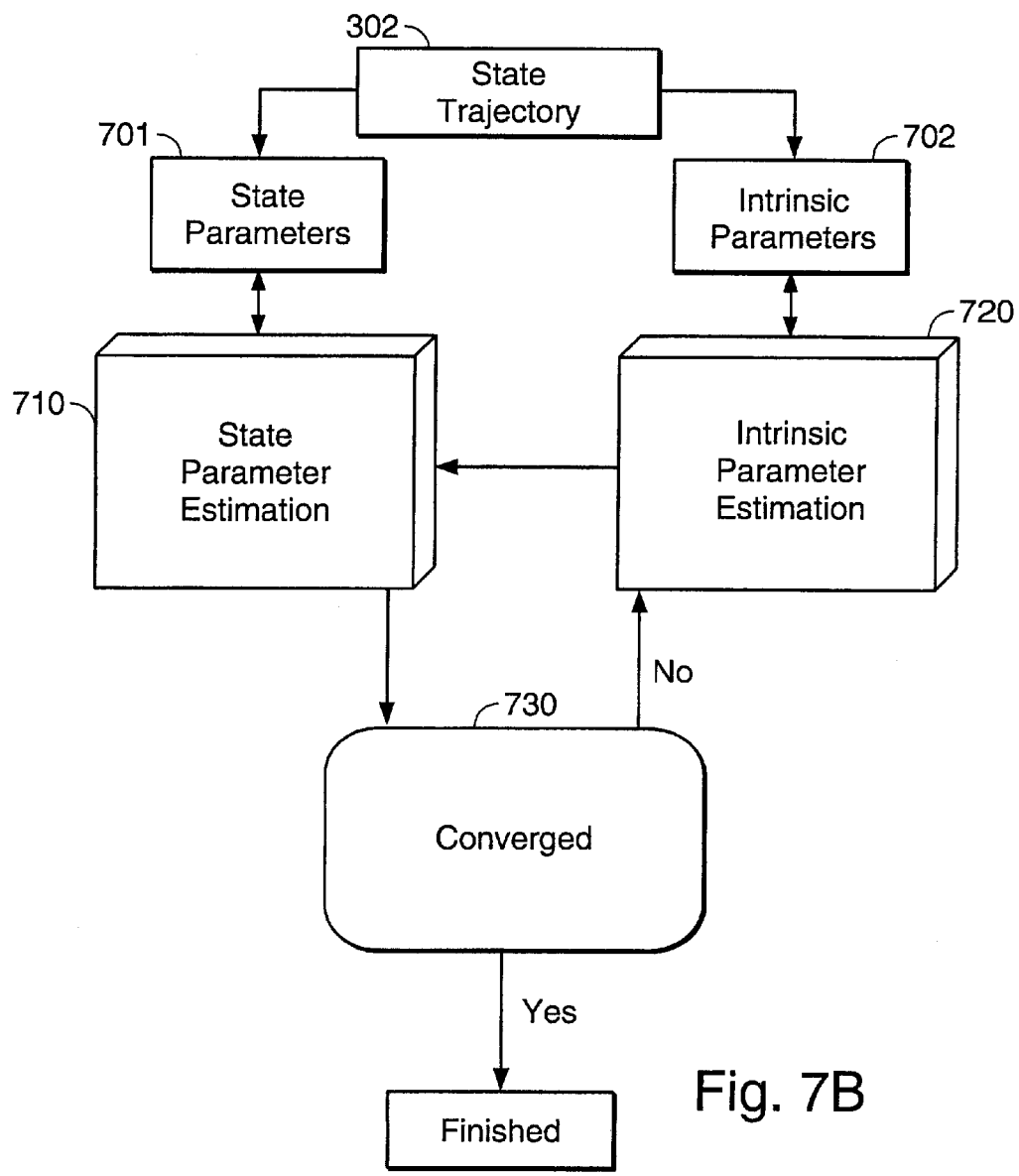
FIG. 7*b* is a flow diagram of an expectation maximization process.

Therefore, as shown in FIG. 7b, the state parameters 701 and intrinsic parameters are alternatively estimated. In step 710, the state parameter 701, such as joint angles and link lengths, will take on new values for each frame in the image sequence while the intrinsic parameters 702 remain fixed. In step 720, the state parameters remain fixed while the intrinsic parameters are updated to compensate for any residual error in the trajectory estimate. Steps 710 and 720 alternate until the parameters converge in step 730.

Using an expectation maximization technique in refining the estimate over the original image sequence may help prevent undesirable interactions between the intrinsic and state parameters during estimation. If these interactions were not a concern, a standard batch nonlinear estimator could be used for the second step as well as the first.

The fitting and refining steps 740 and 750 can be repeated until the residual error is reduced to an acceptable level. This yields a 3-D estimate for the motion of a figure in a monocular sequence of images, and a corresponding estimate for kinematic parameters such as link lengths or rotation axis directions.

Video Compression

Figure 8:
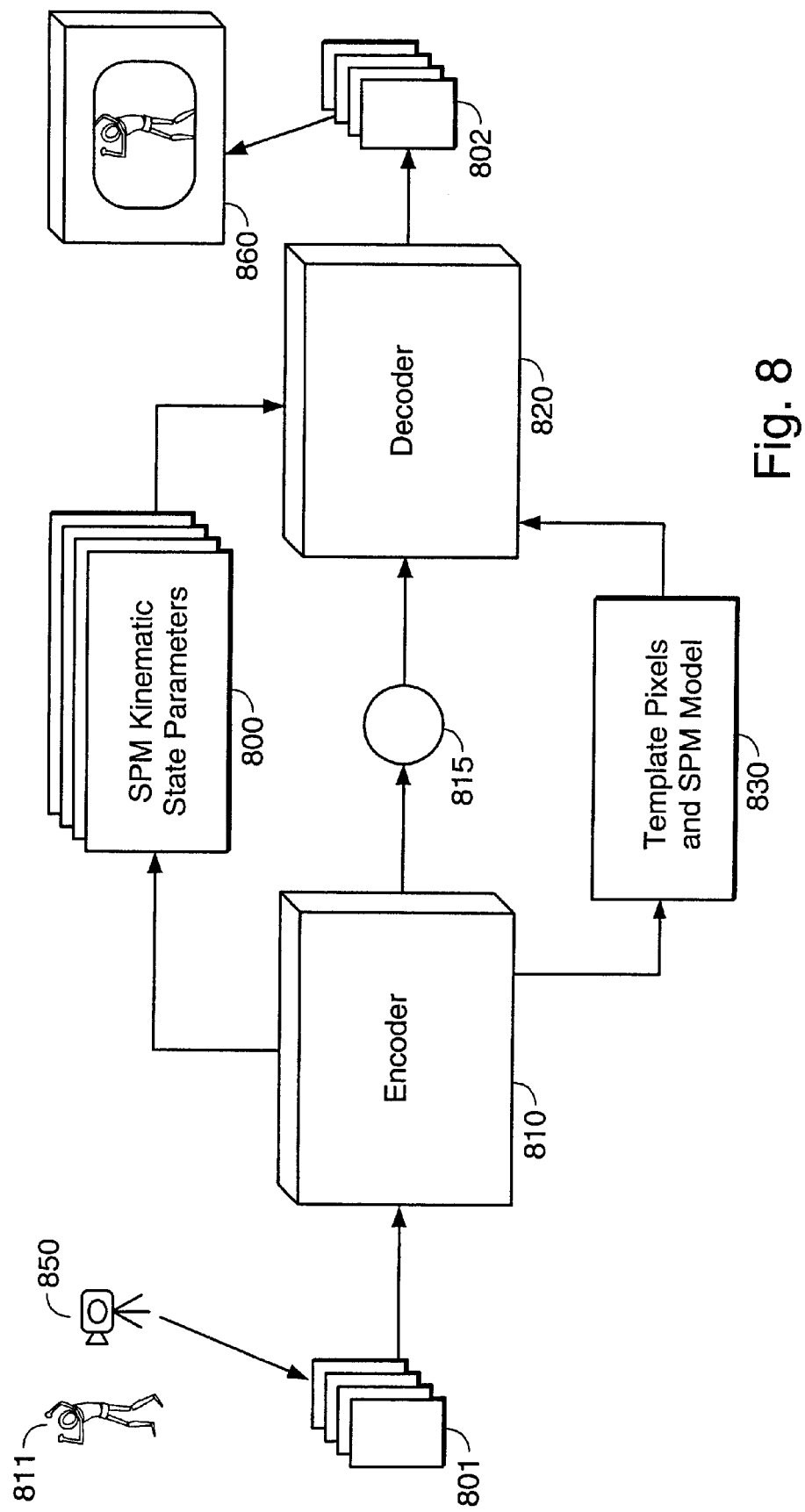
FIG. 8 is a flow diagram of a method for compressing a video using an encoder and a decoder.

One possible application of the present method is for very low-bit rate compression of articulated motion, for example in the context of an MPEG-4 coding scheme as shown in FIG. 8. A single monocular camera 850 measures pixel values in a scene 811 that includes a moving figure. The pixel values can include light intensity and color information over time. The values are digitized as an input sequence of images of a video, i.e., frames 801.

The frames 801 are presented to an encoder 810 that uses the scaled prismatic model as described above to track articulated motion of the figure in an image plane. The encoder 810 produces a time series of state vectors containing SPM kinematic parameters 800, as described above. For each frame 801, the SPM kinematic parameters can be transmitted, along with other varying image motion parameters over a channel 815 to a decoder 820. Substantially static template information and the SPM model (830) can be transmitted at initialization time, and updated as needed.

The decoder 820 uses the forward kinematic model as described above to reconstruct the figure in the scene 511 based on the transmitted motion and template information. The reconstruction produces an output sequence of images 802 that can be rendered on a viewing device 860, e.g., a television or workstation monitor.

In cases where the figure occupies a large portion of the scene, the compression rate can be substantial. This is so because a detailed 2-D human figure model has only 30 parameters, 14 links with 2 parameters each, and 2 additional parameters for global translation. Transmitting just the parameters consumes much less bandwidth on the channel 815 than transmitting the raw pixel data. As an additional advantage, the figure can be reconstructed and rendered as if the camera was placed at a different viewing angle.

It is understood that the above-described embodiments are simply illustrative of the principles of the invention. Various other modifications and changes may be made by those skilled in the art which will embody the principles of the invention and fall within the spirit and scope thereof as set out in the claims attached.

Appendix

Jacobian equations for a scaled prismatic model (SPM) are derived, and the models singularity properties are analyzed.

Kinematics

Each link I in an SPM is a 2-D line segment described by two parameters, an angle $\theta$ theta and a length d. To determine the residual eJacobian for the SPM, it is necessary to find expressions for the velocity of the distal point on a link due to changes in the angles $\theta$ and length d of all previous links in the kinematic chain.

Because a column of the Jacobian, $J_i$, maps the state velocity $dq_i$ to a residual velocity by finding the residual velocity in terms of this state, it is possible to obtain an expression for $J_i$. If $q_i=\theta$ is the angle of a revolute joint of the scaled prismatic model, it will contribute an angular velocity component to links further along the chain given by $w=dqa$. Here, a is the axis of rotation. For the 2-D model this is just the z axis.

The image velocity, $v_p$, of a point at location r on the kinematic chain resulting from this rotation is given by:

$$V_p = Pw \times r = Pa \times r dq = r_{2d} dq,$$

where the orthographic projection P selects the x and y components. This equation expresses the desired mapping from state velocities to image velocities giving the components of the column Jacobian, $j_i$.

$$J_{\theta_i} = \begin{bmatrix} 0 & \text{link } k \text{ where } k < i \\ r_{\|C} & \text{link } k \text{ where } k \geq i \end{bmatrix}$$

If $q_i=d$ refers to the scaled prismatic component of the SPM, its derivative will contribute a velocity component to points on link I proportional to their position on the link: $bq_i$, where b is the fractional position of the point over the total extension $q_i$.

The velocity component for a point, p, on the link is thus $v_p=bq_i dq_i n_i$. Subsequent links, j>I, will be affected only by the end-point extension of the link, and so have a velocity component from this joint given by $v_p=q_i dq_i n_i$. The Jacobian column for an extension parameter, $q_i$, is given by:

$$J_{\varnothing \lceil} = \begin{bmatrix} 0 & \text{link } k, \text{ where } k < i \\ b q \underline{n}_\varnothing & \text{link } i \\ q \underline{n}_\varnothing & \text{link } k, \text{ where } k \geq i \end{bmatrix}$$

It can be shown that given certain modeling assumptions, there exists a 2-D model, with the above specifications, that is flexible enough to capture the projected image of any state of a 3-D model. The assumptions are that manipulator links are locally planar and that the 3-D model is a branched chain of links connected at their end-points by revolute joints. Then, more formally:

Proposition 1

Every 3-D model has a unique corresponding 2-D model, and the 2-D model class is complete in that every state of any projected, branched, linear-chain 3-D model can be expressed as a state of the corresponding 2-D model.

Proof: Consider the graph of a 3-D kinematic model with each joint represented by a vertex and each link by an edge. This graph defines a unique 2-D model where edges map to line segments (scaled projected prismatic links) in the image plane, and vertices map to revolute joints. When a 3-D model in a given state is projected onto a plane, its links remain linear and connectivity is the same, and thus its graph is unchanged. The state of the 2-D model that captures this projection and 3-D state is specified by the distances in the plane between connected joints and the angles between links that share joints. Hence, the 2-D model class can capture any projected 3-D model in any state.

Singularity Analysis

The key advantage of the 2-D model is the location of the singularities. In the 3-D model, the singularities occur in the frequently traversed region of configuration space where links pass through the image plane. Here it is shown that the 2-D model only has singularities when di=0, corresponding to a 3-D link aligned along the focal axis of the camera, and that the singular direction is perpendicular to the entering velocity and so usually does not affect tracking.

Proposition 2:

Given x and y measurements of terinal end points of each joint in a linear chain scaled-prismatic manipulator, observable singularities occur if and only if at least one of the joint lengths is zero.

Proof: A state vector is defined to include pairs of components for each link: $q = [\theta_1 d_1, \ldots, \theta_n d_n]^T$, and the residual vector is the error in x and y end-point positions of each link. Begin by assuming that the proposition holds for a n-1 link manipulator with Jacobian $J_{n-1}$. The Jacobian for the n length manipulator is given by:

$$J_\ll = \begin{bmatrix} J_{\ll - \cap} & A \\ B & C \end{bmatrix}$$

where $J_{n\times 1}$ is a square matrix of size n×2. Matrix A is of size n×2×2, and expresses the dependence of the nth link's parameters on the position of the other links positions, and so is zero. Matrix C and its square are given as:

$$C = \begin{bmatrix} \cos(\theta_J) & -d_\ll \sin(\theta_J) \\ \sin(\theta_J) & d_\ll \cos(\theta_J) \end{bmatrix} \cdot C^J C = \begin{bmatrix} 1 & 0 \\ 0 & d_\ll^{\text{u}} \end{bmatrix}$$

where $$\theta_T = \sum_{i=1}^{n} \theta_i.$$

It can be seen that the matrix C has a rank of two if and only if $d_n \neq 0$.

If C has rank two, then the bottom two rows of $J_n$ are linearly independent of all other rows, and if $J_{n-1}$ is full rank, then $J_n$ must have rank 2n. If C or $J_n\_0$. do not have full rank, then $J_n$ will not have rank 2n, and there will be an observable singularity. To complete the proof, it is only necessary to demonstrate that the proposition applies to the base case, n=1. Here the whole Jacobian is given by C which has full rank only when $d_1 \neq 0$. Thus the proposition is proven.

A further mitigating property of the 2-D singularities is that unlike in the 3-D observable singularities where the singular direction is along the motion trajectory, the singular direction in the 2-D case is always perpendicular to the direction in which the singularity was entered. Hence a manipulator will typically pass through a 2-D singularity without the increased damping caused by moving along a singular direction. Only when the link enters in one direction, and leaves orthogonally does the singularity obstruct tracking. In tracking human figures, this is an unlikely situation.

we claim:

1. A computerized method for tracking a moving articulated figure in a sequence of 2-D images, comprising the steps of:
    representing the figure in the sequence of images with a 2-D scaled prismatic model (SPM), the SPM comprising
        a plurality of prismatic links connected by revolute joints having a connectivity identical to connectivity of the figure, each link having at least two degrees of freedom including, in the image plane, rotation in the image plane about an axis at a base joint of the link, and scaling along the link's prismatic axis, and
        a plurality of templates, a template associated with each link, each template including a plurality of image measurements representing a portion of the articulated moving figure, each template rotating and uniformly scaling responsive to rotation and scaling of the associated link;
    registering, for each image, the 2-D scaled prismatic model responsive to image pixel values; and
    producing from the registered models a state trajectory of the figure in the sequence of images, the state trajectory comprising a sequence of SPM state vectors, each SPM state vector comprising SPM state parameters that describe rotation and scaling of the SPM links for the figure in a corresponding image.

2. The method of claim 1 including capturing the sequence of images with a single monocular camera.

3. The method of claim 1 wherein the 2-D scaled prismatic model acts in a plane parallel to the image plane of eacb image, the 2-D scaled prismatic model describing all possible image projections of an equivalent 3-D kinematic model under orthographic projection onto the image plane.

4. The method of claim 1 wherein the figure is a human body, and the links represent the head, torso and limbs of the human body, and the joints represent the connectivity of the head, torso, and limbs.

5. The method of claim 1 wherein each template has a width w and a height h and an intrinsic coordinate system (u, v).

6. The method of claim 5 wherein transfornation of the pixels of tacit template is expressed as a matrix:

$$T(q) = \begin{bmatrix} \cos(\theta) & -\sin(\theta) & 0 \\ \sin(\theta) & \cos(\theta) & 0 \\ 0 & 0 & 1 \end{bmatrix} \begin{bmatrix} 1 & 0 & d \\ 0 & 1 & 0 \\ 0 & 0 & 1 \end{bmatrix} = \begin{bmatrix} \cos(\theta) & -\sin(\theta) & \cos(\theta)d \\ \sin(\theta) & \cos(\theta) & \sin(\theta)d \\ 0 & 0 & 1 \end{bmatrix}$$

where $\theta$ is the aagle of rotation around the base joint of the associated link, and d is the translation along the prismmtic axis of the link.

7. The method of claim 6 including forward mapping the pixels of each template having intrinsic coordinates u and v to image plane coordinates x and y using:

$$\begin{bmatrix} x \\ y \end{bmatrix} = \begin{bmatrix} u \\ (v/h)d \end{bmatrix} = \begin{bmatrix} u \\ bd \end{bmatrix}$$

where b=v/h gives a position of a particular pixel relative to the scaling of the associated link.

8. The method of claim 1 wherein the 3-D kinematic model is a branched, linear-chain of connected links.

9. The method of claim 8 wherein a singularity occurs if and only if the length of a particular joint lengths is zero.

10. The method of claim 9 wherein a direction of the singularity is always perpendicular to a direction in which the singularity was entered.

11. A computer program product for tracking a moving articulated figure in a sequence of 2-D images, the computer program product comprising usable medium having computer readable code thereon, including program code which:

represents the figure in the sequence of images with a 2-D scaled prismatic model (SPHD comprising a plurality of prismatic links connected bv revolute joints having a connectivity identical to connectivity of the figure, each link having at least two degrees of freedom including, in the image plane, rotation in the image plane about an axis at a base joint of the link, and scaling along the link's prismatic axis, and a plurality of templates, a template associated with each link, each template including a plurality of image measurements representing a portion of the articulated moving figure, each template rotating and uniformly scaling responsive to rotation and scaling of the associated link;

projects, for each image, a pose of the figure onto an image plane, each pose represented by the 2-D scaled prismatic model, the projected poses producing a state trajectory of the figure in the sequence of images, the state trajectory comprising a sequence of SPM state vectors, each SPM state vector comprising SPM state parameters that describe rotation and scaling of the SPM links for the figure in a corresponding image.

12. A system for tracking a moving articulated figure in a sequence of 2-D images, comprising the steps of:

means for representing the figure in the sequence of images as a 2-D scaled prismatic model (SPM) comprising a plurality of prismatic links connected by revolute joints having a connectivity identical to connectivity of the figure, each link having at least two degrees of freedom including, in the image plane, rotation in the image plane about an axis at a base joint of the link, and scaling along the link's prismatic axis, and a plurality of templates, a template associated with each link, each template including a plurality of image measurements representing a portion of the articulated moving figure, each template rotating and uniformly scaling responsive to rotation and scaling of the associated link;

means for projecting, for each image, a pose of the figure onto an image plane, each pose represented by the 2-D scaled prismatic model, the projected poses producing a state trajectory of the figure in the sequence of images, the state trajectory comprising a sequence of SPM state vectors, each SPM state vector comprising SPM state parameters that describe rotation and scaling of the SPM links for the figure in a corresponding image.

\* \* \* \* \*

UNITED STATES PATENT AND TRADEMARK OFFICE
CERTIFICATE OF CORRECTION

PATENT NO. : 6,240,198 B1
DATED : May 29, 2001
INVENTOR(S) : James Matthew Rehg and Daniel D. Morris Page 1 of 1

It is certified that error appears in the above-identified patent and that said Letters Patent is hereby corrected as shown below:

Column 12, claim 3,
Line 58, delete "eacb" and insert -- each --.

Column 13, claim 6,
Line 1, delete "transfornation" and insert -- transformation --;
Line 2, delete "tacit" and insert -- each --;
Line 9, delete "aagle" and insert -- angle --;
Line 10, delete "prismmtic" and insert -- prismatic --;

Column 13, claim 11,
Line 33, delete "(SPHD" and insert -- (SPM) --.

Signed and Sealed this

Nineteenth Day of February, 2002

Attest:

JAMES E. ROGAN
Attesting Officer
Director of the United States Patent and Trademark Office